United States Patent [19]
Chaney et al.

[11] Patent Number: 5,253,067
[45] Date of Patent: Oct. 12, 1993

[54] CHANNEL LABELING APPARATUS FOR A TELEVISION RECEIVER WHEREIN GRAPHICS AND TEXT LABELS MAY BE SELECTED FROM A PREPROGRAMMED LIST

[75] Inventors: John W. Chaney; James E. Hailey, both of Indianapolis, Ind.

[73] Assignee: Thomson Consumer Electronics, Inc., Indianapolis, Ind.

[21] Appl. No.: 807,469

[22] Filed: Dec. 16, 1991

[51] Int. Cl.⁵ .................... H04N 9/74; H04N 5/50
[52] U.S. Cl. .................. 358/191.1; 358/183; 358/22
[58] Field of Search ............ 358/191.1, 192.1, 193.1, 358/194.1, 183, 22, 188

[56] References Cited

U.S. PATENT DOCUMENTS

| | | | |
|---|---|---|---|
| 4,600,918 | 7/1986 | Belisomi et al. | 340/711 |
| 4,706,121 | 11/1987 | Young | 358/142 |
| 4,821,102 | 4/1989 | Ichikawa et al. | 358/22 |
| 4,827,253 | 5/1989 | Maltz | 358/22 |
| 4,835,613 | 5/1989 | Johnson | 358/183 |
| 4,872,054 | 9/1989 | Gray et al. | 358/140 |
| 4,914,517 | 4/1990 | Duffield | 358/191.1 |
| 4,959,720 | 9/1990 | Duffield et al. | 358/191 |
| 4,980,766 | 12/1990 | Vladkov | 358/22 |
| 5,191,423 | 3/1993 | Yoshida | 358/191.1 |

FOREIGN PATENT DOCUMENTS 0391656  10/1990  European Pat. Off.
1-268368 10/1989  Japan.

OTHER PUBLICATIONS

Pages 45–46 of the user Manual for the NEC N968U.
Article entitled "Bold New Gear" by M. Fleischman, Video Magazine, Apr. 1989, pp. 36–39 and 54–55.
Service Manual for Grundig television receiver CUC 2400.

Primary Examiner—James J. Groody
Assistant Examiner—John W. Miller
Attorney, Agent, or Firm—Joseph S. Tripoli; Peter M. Emanuel; Thomas F. Lenihan

[57] ABSTRACT

It is herein recognized that it is desirable that a television receiver provide preprogrammed labels for many widely-used television networks. The user has only to select the proper channel and then select a corresponding preprogrammed label from a list in order to associate the channel and label. In one embodiment the preprogrammed label is a graphically-formed logo or service mark of the television network.

4 Claims, 5 Drawing Sheets

CHANNEL LABELING APPARATUS FOR A TELEVISION RECEIVER WHEREIN GRAPHICS AND TEXT LABELS MAY BE SELECTED FROM A PREPROGRAMMED LIST

This invention concerns television receivers having a channel labelling function.

BACKGROUND OF THE INVENTION

Many modern television receivers include a channel labelling feature in which a user is asked to enter a suitable label for each channel. This may be done by selecting individual letters from a running display of letters, or by entering letters from an alphabetical keyboard on a remote control unit. Such a channel labelling feature is known from, for example, RCA CTC-140 type television receivers manufactured by Thomson Consumer Electronics Incorporated, Indianapolis, Ind.

Unfortunately, this process can take an inordinate amount of time and patience on the user's part given that modern cable television services may deliver as many as 125 channels.

SUMMARY OF THE INVENTION

It is herein recognized that it is desirable that a television receiver provide preprogrammed labels for many widely-used television networks. The user has only to select the proper channel and then select a corresponding preprogrammed label from a list in order to associate the channel and label. In one embodiment the preprogrammed label is a graphically-formed logo or service mark of the television network.

DETAILED DESCRIPTION OF THE DRAWING

Figure 1:
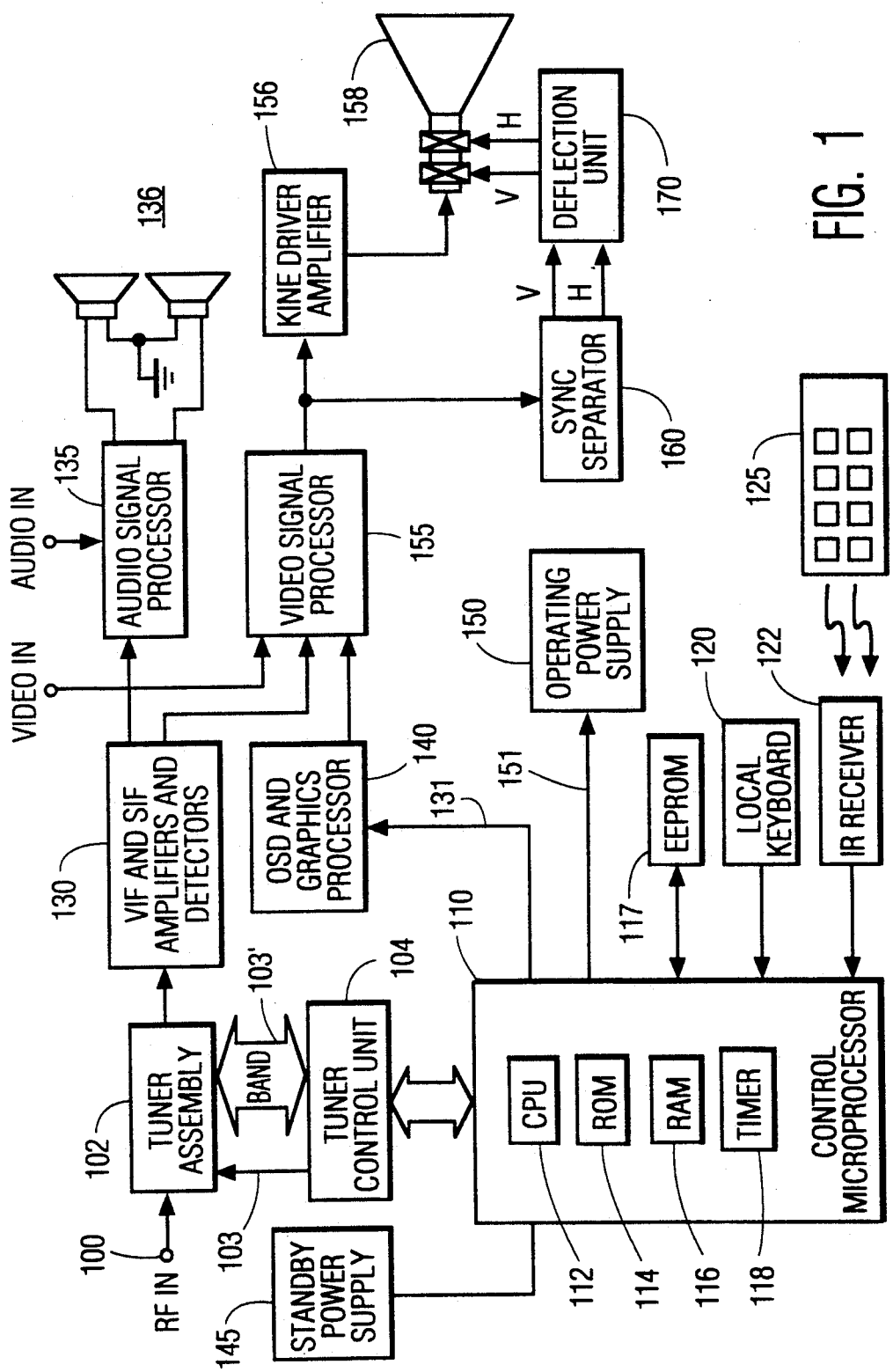
FIG. 1 is a block diagram of a portion of a television receiver suitable for implementing the invention.

Referring to FIG. 1, a television receiver includes an RF input terminal 100 which receives radio frequency (RF) signals and applies them to a tuner assembly 102. Tuner assembly 102 selects and amplifies a particular RF signal under control of a tuner controller 104 which provides a tuning voltage via a wire 103, and bandswitching signals via signal lines represented by the broad double-ended arrow 103', to tuner assembly 102.

Tuner assembly 102 converts the received RF signal to an intermediate frequency (IF) signal and provides an IF output signal to video (VIF) and sound (SIF) amplifier and detector unit 130. VIF/SIF amplifier and detector unit 130 amplifies the IF signal applied to its input terminal and detects the video and audio information contained therein. The detected video information is applied as one input of a video processor unit 155. The other input of video processor unit 155 is connected to an on-screen display and graphics processor circuit 140. The detected audio signal is applied to an audio processor 135 for processing and amplification before being applied to a speaker assembly 136.

Tuner controller 104 generates the tuning voltage and bandswitching signals in response to control signals applied from a system control microcomputer (μC) 110. The terms "microcomputer", controller, and "microprocessor", as used herein, are equivalent. It is also recognized that the control function of microcomputer 110 may be performed by an integrated circuit especially manufactured for that specific purpose (i.e., a "custom chip"), and the term "controller", as used herein, is also intended to include such a device. Microcomputer 110 receives user-initiated commands from an infrared (IR) receiver 122 and from a "local" keyboard 120 mounted on the television receiver itself. IR receiver 122 receives IR transmissions from remote control transmitter 125. Microcomputer 110 includes a central processing unit (CPU) 112, a program memory (ROM) 114, and stores channel-related data in a random-access memory (RAM) 116 RAM 116 may be either internal to, or external to, microprocessor 110, and may be of either the volatile or non-volatile type. The term "RAM" is also intended to include electrically-erasable programmable read only memory (EEPROM) 117. One skilled in the art will recognize that if volatile memory is utilized, it may be desirable to use a suitable form of standby power to preserve its contents when the receiver is turned off.

Microcomputer 110 operates from a source of standby power 145, and controls a source of operating power 150 via a control line 151 for selectively applying power to the remainder of the television receiver. Microcomputer 110 also includes a timer 118. Microcomputer (or controller) 110 generates a control signal for causing tuner control unit 104 to control tuner 102 to select a particular RF signal, in response to user-entered control signals from local keyboard 120 and from infrared (IR) receiver 122.

Tuner 102 produces a signal at an intermediate frequency (IF) and applies it to a processing unit 130 comprising a video IF (VIF) amplifying stage, an AFT circuit, a video detector, and a sound IF (SIF) amplifying stage. Processing unit 130 produces a first baseband composite video signal (TV), and a sound carrier signal. The sound carrier signal is applied to an audio signal processor unit 135 which includes an audio detector and may include a stereo decoder. Audio signal processor unit 135 produces a first baseband audio signal and applies it to a speaker unit 136. Second baseband composite video signals and second baseband audio signals may be applied to VIDEO IN and AUDIO IN terminals from an external source.

The first and second baseband video signals (TV) are coupled to a video processor unit 155 (having a selection circuit not shown) Under control of controller 110, an on-screen display processor 140 generates character signals and graphics signals, and applies them to a second input of video signal processor 155, for inclusion in the processed video signal. Electrically-erasable programmable read only memory (EEPROM) 117 is coupled to controller 110, and serves as a non-volatile storage element for storing autoprogramming channel data, and user-entered channel data.

The processed video signal at the output of video signal processor unit 155, is applied to a Kine Driver Amplifier 156 for amplification and then applied to the guns of a color picture tube assembly 158 for display. The processed video signal at the output of video signal processor unit 155, is also applied to a Sync Separator unit 160 for separation of horizontal and vertical drive signals which are in turn applied to a deflection unit 170. The output signals from deflection unit 170 are applied to deflection coils of picture tube assembly 158 for controlling the deflection of its electron beam. The television receiver described thusfar with the exception of OSD and GRAPHICS PROCESSOR 140 is known, for example, from the RCA CTC-140 color television manufactured by Thomson Consumer Electronics, Inc., Indianapolis, Ind.

The invention will now be described with reference to the remainder of FIG. 1, the menu displays of FIGS. 2a-2c, and the screen displays of FIGS. 3a and 3b.

Figure 2A:
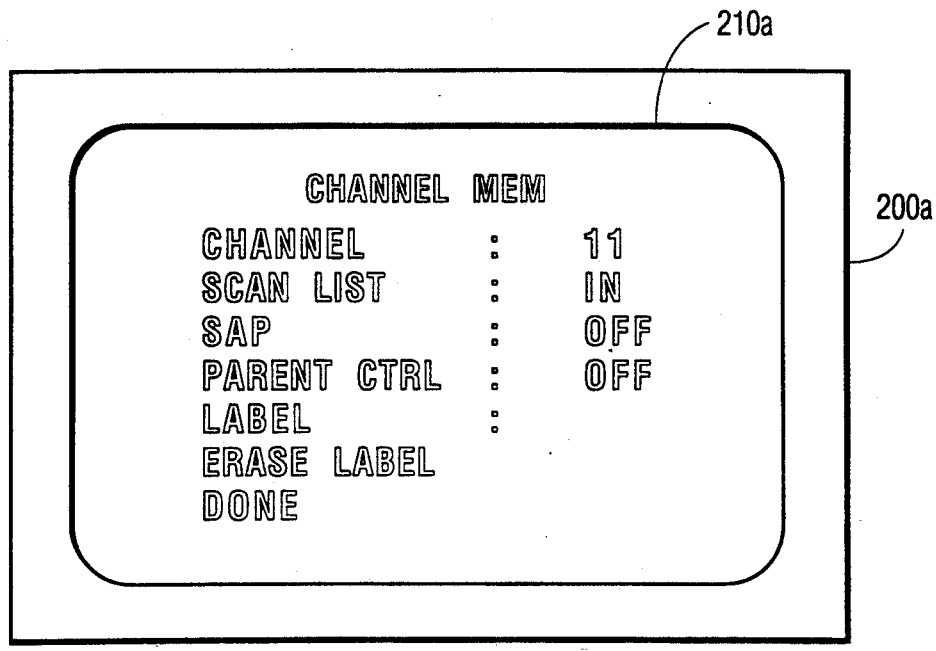
FIGS. 2a-2c are illustrations of screen displays produced in accordance with the invention.
Figure 2B:
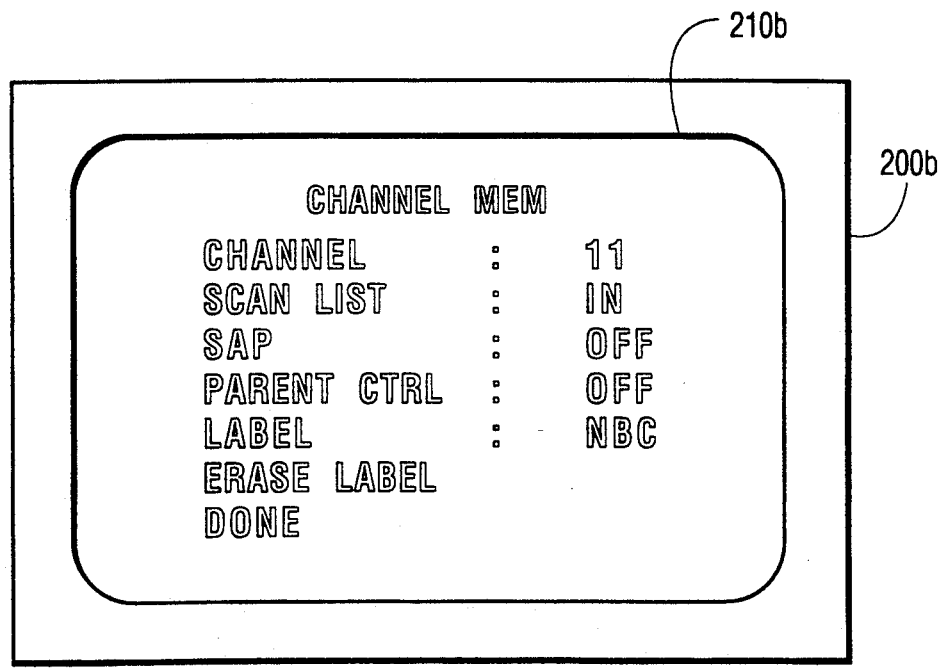
Figure 2C:
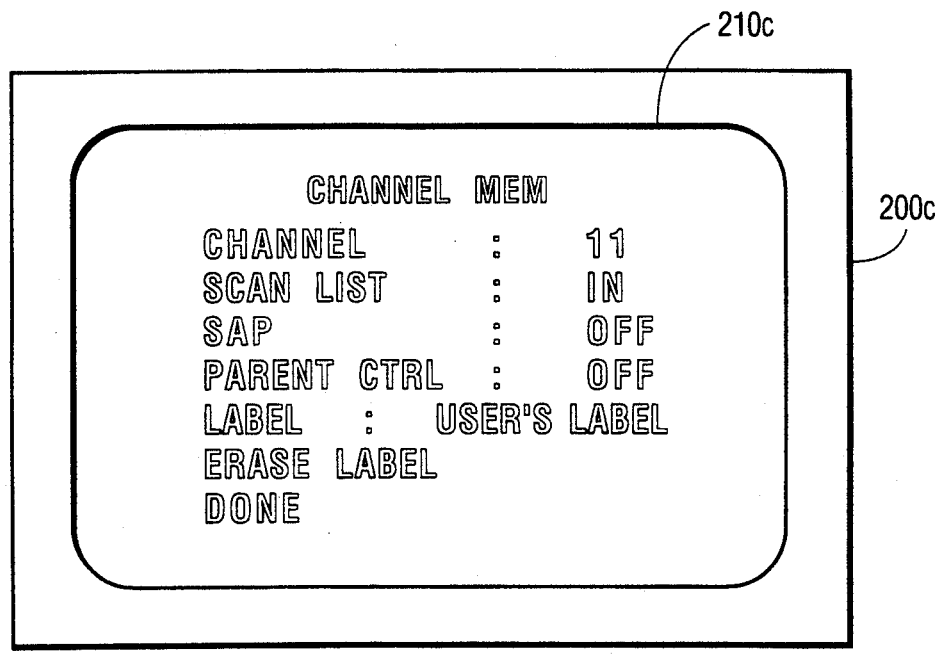
Figure 3A:
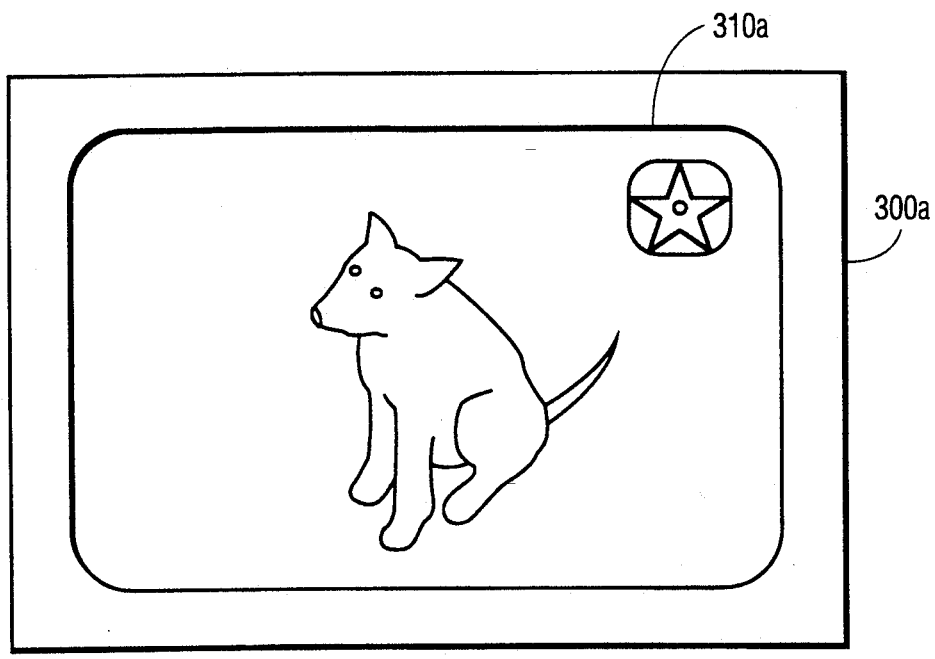
FIGS. 3a and 3b are illustrations of channel labels displayed on screen.
Figure 3B:
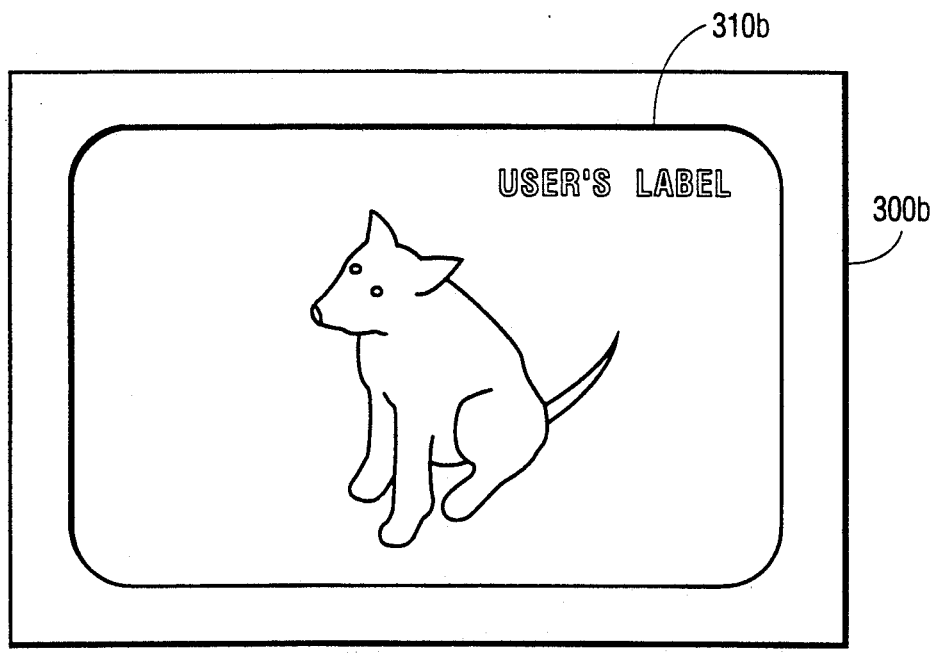

FIG. 2a shows a menu screen called up by a user wanting to enter a label for channel 11. To modify the label, the user highlights the LABEL line by using the + and − keys of remote control unit 125 to move up and down through the menu and by selecting the label line by pressing its SELECT key. Then user then presses the + and − keys to step through a preprogrammed list of labels. FIG. 2b shows the preprogrammed label NBC. If the user desires to enter the preprogrammed label NBC, he simply presses the SELECT key of remote control unit 125. If, on the other hand, the user cannot find an appropriate preprogrammed label, then he steps through the list until he finds the label YOU ENTER. Upon selecting the YOU ENTER label, the user may enter his own label by pressing the +, −, and SELECT keys of remote control unit 125 until he has spelled the desired label. To further illustrate this point, FIG. 2c shows a user-entered label USER"S LABEL, and FIG. 3b shows the user-entered label displayed on the screen 310b of a television receiver 310a.

OSD and GRAPHICS PROCESSOR unit 140 of FIG. 1, includes the capability of producing high resolution graphics for display on the screen of picture tube assembly 158, under control of controller 110. Controller 110 communicates with OSD and GRAPHICS PROCESSOR unit 140 via a digital control bus 131. One of the capabilities of OSD and GRAPHICS PROCESSOR unit 140 is the ability to generate graphics logos or service marks of various sizes on the screen. FIG. 3a shows a television receiver 300a, having a screen 310a showing a video image with the logo a television network displayed in the upper right corner. Data corresponding to this logo is stored in ROM and generated by OSD and GRAPHICS PROCESSOR unit 140. The procedure for associating a graphics logo with a television channel is the same as that given above for selecting a text label. That is, the user steps through a list of preprogrammed text labels until he finds the proper one, for example NBC. Upon selecting NBC, controller 110 causes OSD and GRAPHICS PROCESSOR unit 140 to substitute a preprogrammed graphics logo, if one exists in memory, for the corresponding text label.

A constructed and tested version of the invention includes 108 preformed labels and memory space for 19 user-entered labels.

What is claimed is:

1. A television receiver, comprising:
   means for entering data in response to operation by a user;
   memory means for storing data representative of a preprogrammed label;
   control means coupled to said memory means for reading said data from said memory means; and
   on-screen display and graphics generator means coupled to said control means for producing text character video signals and graphics video signals for display, said text character and graphics video signals corresponding to said stored data;
   said control means associating said stored data representative of a preprogrammed label with a television channel in response to data input by a user.

2. The apparatus of claim 1 wherein said preprogrammed label is a network logo or service mark.

3. The apparatus of claim 1 wherein said preprogrammed label comprises text characters.

4. The apparatus of claim 1 wherein a portion of said data entered by said user is data representative of an alternative text label.

* * * * *